(12) United States Patent
Yamada

(10) Patent No.: US 9,905,197 B2
(45) Date of Patent: Feb. 27, 2018

(54) VEHICLE DISPLAY DEVICE AND VEHICLE DISPLAY METHOD

(71) Applicant: TOYOTA JIDOSHA KABUSHIKI KAISHA, Toyota-shi, Aichi-ken (JP)

(72) Inventor: Yoshinori Yamada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 14/979,953

(22) Filed: Dec. 28, 2015

(65) Prior Publication Data

US 2016/0203792 A1 Jul. 14, 2016

(30) Foreign Application Priority Data

Jan. 13, 2015 (JP) .................. 2015-004384

(51) Int. Cl.
| | |
|---|---|
| G09G 5/10 | (2006.01) |
| G09G 5/00 | (2006.01) |
| B60Q 3/217 | (2017.01) |
| D03D 15/00 | (2006.01) |
| B60Q 3/74 | (2017.01) |
| B60Q 3/80 | (2017.01) |
| B60Q 3/54 | (2017.01) |
| G09G 3/20 | (2006.01) |
| B60Q 3/78 | (2017.01) |

(52) U.S. Cl.
CPC ............... *G09G 5/10* (2013.01); *B60Q 3/217* (2017.02); *B60Q 3/54* (2017.02); *B60Q 3/745* (2017.02); *B60Q 3/80* (2017.02); *D03D 15/00* (2013.01); *G09G 5/003* (2013.01); *B60Q 3/78* (2017.02); *B60Q 2500/10* (2013.01); *G09G 3/20* (2013.01); *G09G 2300/0452* (2013.01); *G09G 2320/0626* (2013.01); *G09G 2380/02* (2013.01); *G09G 2380/10* (2013.01)

(58) Field of Classification Search
CPC .......................................... G06T 2207/30252
See application file for complete search history.

(56) References Cited

U.S. PATENT DOCUMENTS 4,709,985 A * 12/1987 Takeuchi .................. B60R 1/00
385/116
5,815,624 A * 9/1998 Rosenberg ................ B60R 1/00
385/115

(Continued)

FOREIGN PATENT DOCUMENTS

| JP | 2001-151012 A | 6/2001 |
| JP | 2010-267573 A | 11/2010 |

*Primary Examiner* — Bryan Earles
(74) *Attorney, Agent, or Firm* — Oliff PLC

(57) ABSTRACT

A vehicle display device includes an image processing electronic control unit that converts a portion of each image of plural images into respective strip images in which plural pixels are arrayed along a direction of vehicle travel; an optical fiber woven fabric in which plural optical fibers are woven, with end portions of the plural optical fibers arrayed along the direction of vehicle travel; and plural light sources arrayed such that light emitted from each of the plural light sources is incident at an end portion of at least one of the optical fibers; wherein the image processing electronic control unit controls the plural light sources for each of the strip images so as to emit light according to a pixel value of each pixel in the strip images.

14 Claims, 15 Drawing Sheets

(56) References Cited

U.S. PATENT DOCUMENTS

| | | | |
|---:|---|---|---|
| 9,663,023 B2* | 5/2017 | Strolz | B60Q 1/085 |
| 2006/0103509 A1* | 5/2006 | Chung | B60Q 9/008 |
| | | | 340/425.5 |
| 2014/0244115 A1* | 8/2014 | Sanma | B62D 15/029 |
| | | | 701/42 |

* cited by examiner

VEHICLE DISPLAY DEVICE AND VEHICLE DISPLAY METHOD

CROSS-REFERENCE TO RELATED APPLICATION

This application claims priority under 35 USC 119 from Japanese Patent Application No. 2015-004384, filed on Jan. 13, 2015 the disclosure of which is incorporated by reference herein in its entirety.

BACKGROUND

Field of the Invention

The disclosed embodiments relate to a vehicle display device and a vehicle display method.

Related Art

Recently, various devices for providing light inside a vehicle cabin, which is a space occupied by an occupant, have been proposed. For example, in order to improve decorative properties inside a vehicle cabin, a door trim provided with a lighting device (see, for example, Japanese Patent Application Laid-Open (JP-A) No. 2001-151012), is known. Further, technology that uses a fabric covering the surface of an interior component of a vehicle as a lighting device so that the inside of the vehicle cabin is uniformly lit (see, for example, JP-A No. 2010-267573), is known. This technology employs an optical fiber woven fabric in which optical fibers are woven together with specific threads as the fabric on the interior component, and unevenness in light emission from the optical fiber woven fabric is suppressed by adjusting the spacing and the brightness of light emission of the optical fibers.

However, although providing light inside the vehicle cabin may provide brightness, this may not provide an occupant with information. For example, when driving the vehicle, the occupant checks the surrounding conditions of the vehicle by visually checking mirrors, making direct visual checks, and the like. In this process, in order to provide information to make the occupant aware of the surrounding conditions of the vehicle, there is a need to provide information indicating the surrounding conditions of the vehicle. Accordingly, merely providing light inside the vehicle cabin is insufficient.

Recently, driving assistance technology that assists an occupant with driving a vehicle is progressing. Accompanying advances in driving assistance technology, it is thought that driving assistance will include cases in which the occupant hands over driving control to the vehicle side. In such cases, the surrounding conditions of the vehicle change constantly accompanying vehicle travel, and it is preferable for the occupant to be aware of the surrounding conditions of the vehicle. Note that, in cases in which driving control is handed over to the vehicle side, sometimes the occupant's level of concentration may be in a reduced state in comparison to a state in which the occupant maintains their level of concentration when manually driving the vehicle. When in such a state of reduced concentration, merely providing light inside the vehicle cabin may not be sufficient to make the occupant aware of the surrounding conditions of the vehicle.

SUMMARY

The present disclosure provides a vehicle display device and a vehicle display method capable of imparting the surrounding conditions of a vehicle to an occupant.

A first aspect is a vehicle display device including: an image processing electronic control unit that converts at least a portion of each image of a plurality of images into respective strip images, each of the strip images having a plurality of pixels arrayed along a direction of vehicle travel, the plurality of images being obtained by successively capturing the images of the surroundings of a vehicle; an optical fiber woven fabric having a plurality of optical fibers woven as warp or weft together with threads, end portions of the plurality of optical fibers arrayed along the direction of vehicle travel; and a plurality of light sources arrayed such that light emitted from each of the plurality of light sources is incident at the end portion of at least one of the optical fibers, wherein the image processing electronic control unit controls the plurality of light sources so as to emit light according to a pixel value of each pixel in the strip images.

According to the first aspect, the plural images are obtained by successively capturing the images of the surroundings of the vehicle. The image processing electronic control unit converts at least a portion of each image among the plural images into the respective strip image, in which plural pixels are arrayed along the direction of vehicle travel. The optical fiber woven fabric has the plural optical fibers woven as warp or weft together with the threads, with the end portions of the plural optical fibers arrayed in the direction of vehicle travel. The plural light sources are arrayed such that light emitted from each of the plural light sources is incident to the end portions of the optical fibers. The image processing electronic control unit controls the plural light sources so as to emit light according to the pixel value of each pixel in the strip images. The plural light sources are accordingly controlled for each strip image, enabling the surrounding conditions of the vehicle to be presented by at least movement of high and low brightness of light in the optical fiber woven fabric.

A second aspect, includes the first aspect, in which each of the strip images is expressed by pixel values representing at least one of a brightness or a color of each pixel.

Accordingly, in the second aspect, an occupant may be presented with more detailed surrounding conditions of the vehicle, due to expressing the strip image by pixel values representing at least one out of the brightness or the color of each pixel.

A third aspect includes any of the above aspects, in which the image processing electronic control unit converts a composite image, which is obtained by combining images included in respective divided regions obtained by dividing each image of the plurality of images into a plurality of regions, into each of the strip images.

Accordingly, in the third aspect, even when features are only present in portions of the image, surrounding conditions of the vehicle may be presented that reflect these features.

A fourth aspect includes any of the above aspects, and further includes: a transceiver that acquires sense of speed information, wherein the image processing electronic control unit combines light points having a specific spacing into the strip images such that the light points having the specific spacing move in each strip image when the sense of speed information has been acquired by the transceiver.

Accordingly, in the fourth aspect, a sense of speed is imparted to the occupant by combining the light points into the strip images so that the light points move, and presenting light using the optical fiber woven fabric to the occupant based on the strip images.

A fifth aspect includes any of the above aspects, and further includes a transceiver that acquires information indicating surrounding conditions of the vehicle, wherein the image processing electronic control unit appends a predetermined color to the strip images when it is determined that there is a need to alert an occupant based on the information indicating surrounding conditions of the vehicle acquired by the transceiver.

Accordingly, in the fifth aspect, the occupant may be prompted with an alert by appending color to the strip image, and presenting light using the optical fiber woven fabric to the occupant using the strip image.

A sixth aspect is a vehicle display method including: converting, with an image processing electronic control unit, at least a portion of each image of a plurality of images into respective strip images, each of the strip images having a plurality of pixels arrayed along a direction of vehicle travel, the plurality of images being obtained by successively capturing the images of the surroundings of a vehicle; and effecting control, with the image processing electronic control unit, for each of the strip images, such that light according to a pixel value of each pixel in the strip images is emitted from a plurality of light sources, which are arrayed such that the light emitted from each of the plurality of light sources is incident at an end portion of at least one optical fiber in an optical fiber woven fabric having a plurality of optical fibers woven as warp or weft together with threads, with end portions of the plurality of optical fibers being arrayed along the direction of vehicle travel.

As described above, the above aspects may inform the surrounding conditions of the vehicle to an occupant of the vehicle.

BRIEF DESCRIPTION OF THE DRAWINGS

Exemplary embodiments will be described in detail based on the following figures, wherein.

DETAILED DESCRIPTION

Detailed explanation follows regarding exemplary embodiments, with reference to the drawings.

First Exemplary Embodiment

Figure 1:
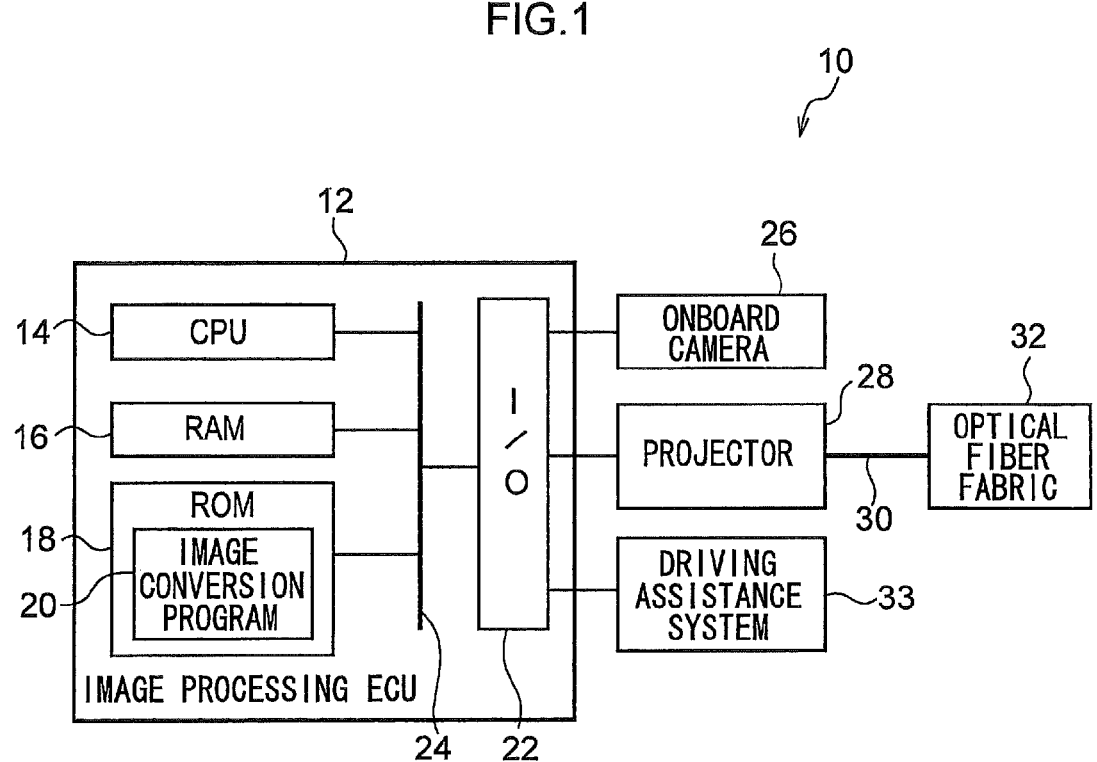
FIG. 1 is a block diagram illustrating a configuration of a vehicle-installed device according to a first exemplary embodiment.

FIG. 1 illustrates a configuration of a vehicle-installed device 10 according to the present exemplary embodiment. The vehicle-installed device 10 is an example of a vehicle display device according to the present disclosure. The vehicle-installed device 10 is installed to a vehicle, and is a device that presents an occupant (for example, the person who is driving, referred to below as the driver) with information indicating surrounding conditions of the vehicle.

The vehicle-installed device 10 includes an image processing ECU 12, an onboard camera 26, a projector 28, a fastening strip 30, and an optical fiber fabric 32.

As illustrated in FIG. 1, the image processing ECU 12 includes a CPU 14, RAM 16, ROM 18 serving as a non-volatile storage section storing an image conversion program 20, and an input/out interface (I/O) 22, mutually connected through a bus 24. The I/O 22 is connected to the onboard camera 26 and the projector 28. The onboard camera 26 obtains the surrounding conditions of the vehicle by capturing an image of the surroundings of the vehicle. In the present exemplary embodiment, explanation is given regarding a case in which the onboard camera 26 is provided so as to be capable of capturing the image of the surrounding conditions on the right side of the vehicle, and outputs image signals expressing images of the surroundings on the right side of the vehicle. The projector 28 is a device that projects light of an image corresponding to an image signal output from the image processing ECU 12 to the optical fiber fabric 32 provided inside the vehicle cabin using the fastening strip 30.

The image processing ECU 12 reads the image conversion program 20 from the ROM 18 and expands it in the RAM 16, and executes the expanded image conversion program 20 using the CPU 14, such that the image processing ECU 12 operates as a controller that controls the projector 28 and a conversion section that converts a captured image representing the surrounding conditions of the vehicle into an image to be projected (or provided) to the optical fiber fabric 32 by the projector 28.

A driving assistance system 33 is connected to the I/O 22. The driving assistance system 33 performs drive support processing to assist the driver with driving the vehicle. The driving assistance system 33 is capable of outputting information representing the performance of driving assistance processing. For example, the driving assistance system 33 is capable of performing driving assistance processing, such as automatic steering by intervening automatically according to the behavior of the vehicle when the driver is driving manually. Further, the driving assistance system 33 can be set to a high-level mode in which the occupant hands over driving control to the vehicle side, and the vehicle is driven by the driving assistance system 33.

Figure 2:
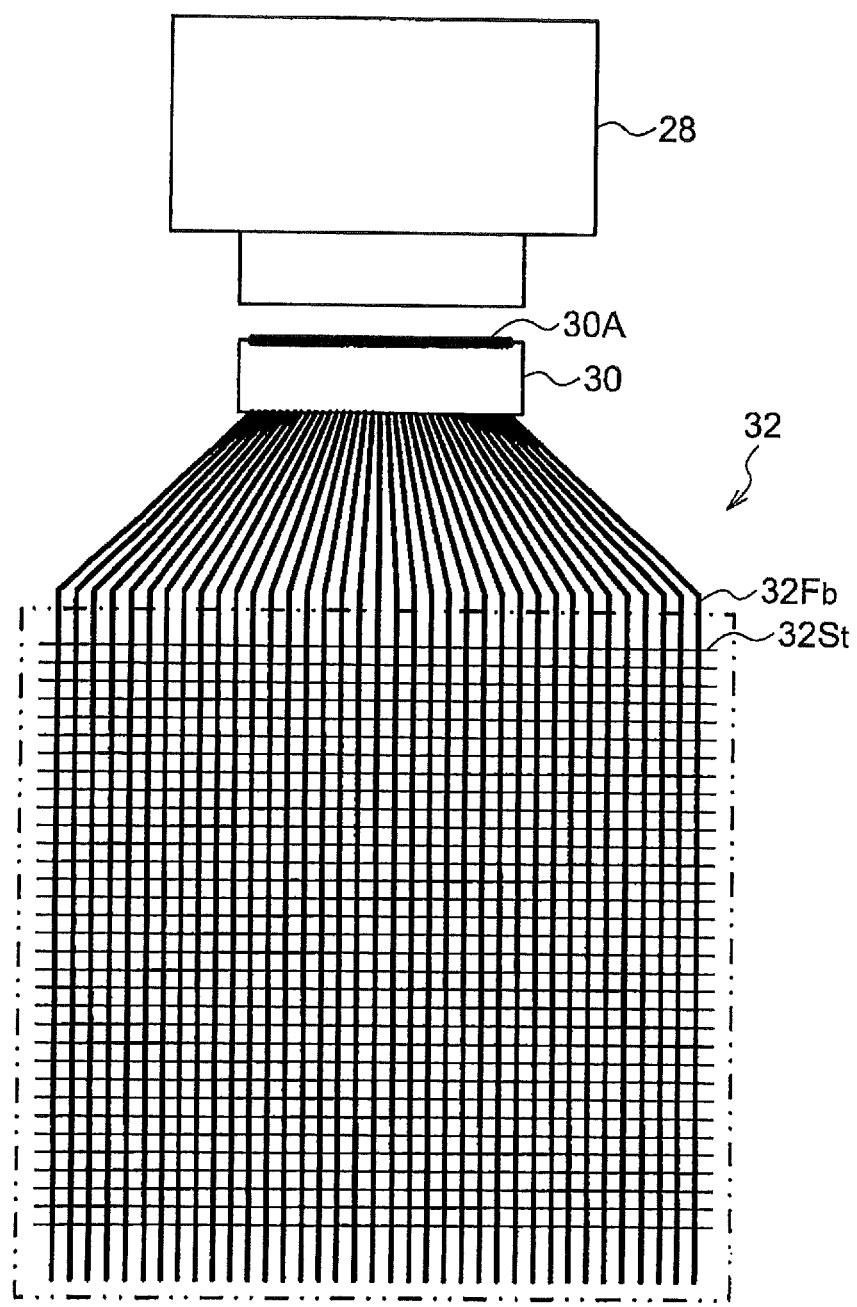
FIG. 2 is a block diagram illustrating a configuration of an optical fiber fabric.

FIG. 2 illustrates an example of a configuration of the optical fiber fabric 32. The optical fiber fabric 32 is a woven fabric that is woven from a combination of threads and optical fibers, so as to include optical fibers as at least some of the threads in one out of the weft or the warp. As illustrated in FIG. 2, in the optical fiber fabric 32 of the present exemplary embodiment, optical fibers 32Fb and predetermined specific threads 32St are woven together, using the optical fibers 32Fb as the thread of the warp, and using the specific threads 32St as the thread of the weft. First end portions of the optical fibers 32Fb are gathered together by the fastening strip 30, so as to be arrayed along a one dimensional direction in accordance with the array sequence in which the optical fibers 32Fb are woven. In the fastening strip 30, the first end portions of the optical fibers 32Fb arrayed along the one dimensional direction configure a light incident portion 30A. The projector 28 projects a one dimensional image into the light incident portion 30A.

By projecting the one dimensional image into the light incident portion 30A using the projector 28, the one dimensional image is presented inside the vehicle cabin as a flat image following the array of the one dimensional image, expanded across a two dimensional face configured by the plural optical fibers 32Fb of the optical fiber fabric 32. Namely, an image is presented inside the vehicle cabin on a face configured by lining up line images of each of the optical fibers 32Fb.

The optical fiber fabric 32 may be used as a fabric (textile or woven fabric) provided at an interior surface portion of the vehicle, such as a vehicle cabin inside surface of a seat or as a door trim. In such cases, threads of the fabric provided to the interior surface portion may be employed as the specific threads in the optical fiber fabric 32. Since the optical fibers 32Fb have high transmissivity to light in directions intersecting with the optical axis direction of the optical fibers, weaving the specific threads together with the optical fibers 32Fb gives the optical fiber fabric 32 a similar appearance to other fabric provided to the interior surface portion. In the present exemplary embodiment, explanation is given regarding an example in which the driving seat is provided on the right side of the vehicle, and the optical fiber fabric 32 is provided to the surface of a door trim at the side of the driver, namely on the right side in the direction of vehicle travel. The optical fiber fabric 32 is provided to the surface of the door trim on the right side in the direction of vehicle travel, such that the length direction of the optical fibers 32Fb runs in the vehicle up-down direction (that is, the optical fibers extend vertically).

The configuration of the optical fiber fabric 32 is not limited to the configuration illustrated in FIG. 2, and other known configurations may be adopted. Moreover, there is no limitation to providing the optical fiber fabric 32 to a door trim. For example, provision may be made to a door trim on the left side, or to any surface portion inside the vehicle cabin.

Figure 3:
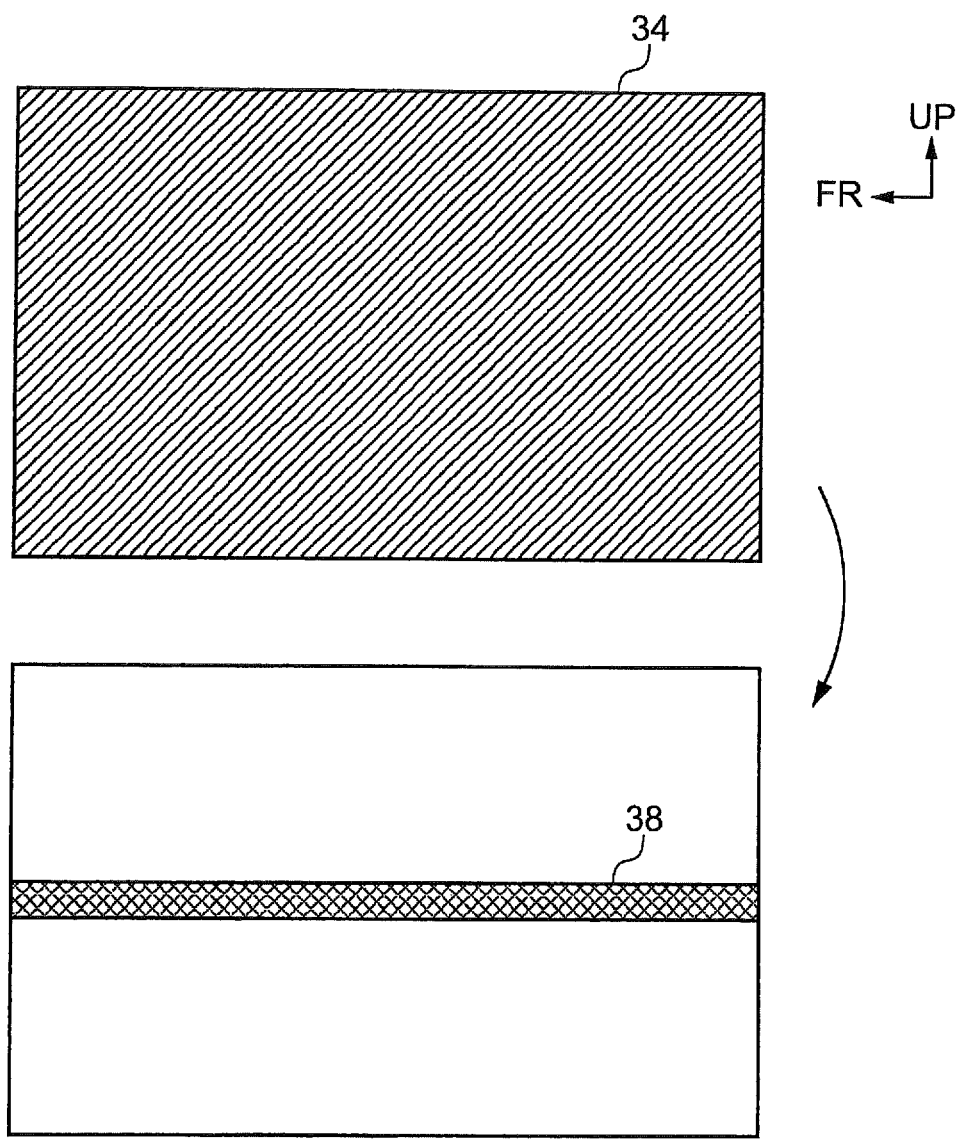
FIG. 3 is an explanatory drawing illustrating an image obtained by image conversion processing.

Explanation follows regarding the conversion section and controller, as implemented by the image processing ECU 12. FIG. 3 illustrates an example of an image obtained by image conversion processing executed by the image processing ECU 12. In FIG. 3, the arrow UP and the arrow FR respectively indicate the vehicle up-down direction upper side, and the vehicle front-rear direction front side.

As illustrated in FIG. 3, the image processing ECU 12 that operates as the conversion section converts a captured image 34 into a strip image 38. The strip image 38 is an image to be projected by the projector 28 as a one dimensional image into the light incident portion 30A, which is configured by the first end portions of the optical fibers 32Fb of the optical fiber fabric 32. Note that up-down direction length of the strip image 38 corresponds to the width of the light incident portion 30A at the fastening strip 30, namely corresponds to the diameter of the optical fibers 32Fb onto which the projector 28 projects. Conversion of the captured image 34 into the strip image 38 may be performed by executing image combining processing including at least one of averaging processing, addition processing, integration processing, or thinning processing, to one image component out of brightness or color included in each of the lines corresponding to single pixels running in the image up-down direction. The image processing ECU 12 may execute contrast enhancement processing and color enhancement processing on the image.

Note that when the captured image 34, which is a two dimensional image, is converted into a one dimensional image by employing all image components included in the image up-down direction of the captured image 34, the surrounding conditions of the vehicle included in the captured image 34 may not be reflected in the strip image 38. For example, in a case in which conversion into the one dimensional image is performed by simply summing the color component of the captured image 34, the one image component out of the brightness or color would be summed for respective individual lines corresponding to single pixels running in the image up-down direction. In such case, the strip image 38 tend to incline toward the bright, white side, and at least one out of the brightness or color of the surrounding conditions of the vehicle would sometimes be poorly reflected.

Accordingly, in the present exemplary embodiment, image processing is executed such that abstraction of the surrounding conditions of the vehicle into a one dimensional image is performed by dividing the captured image 34 into plural portions, and using each of the divided images. Specific explanation follows regarding image processing for abstraction of the surrounding conditions of the vehicle into a one dimensional image.

Figure 4:
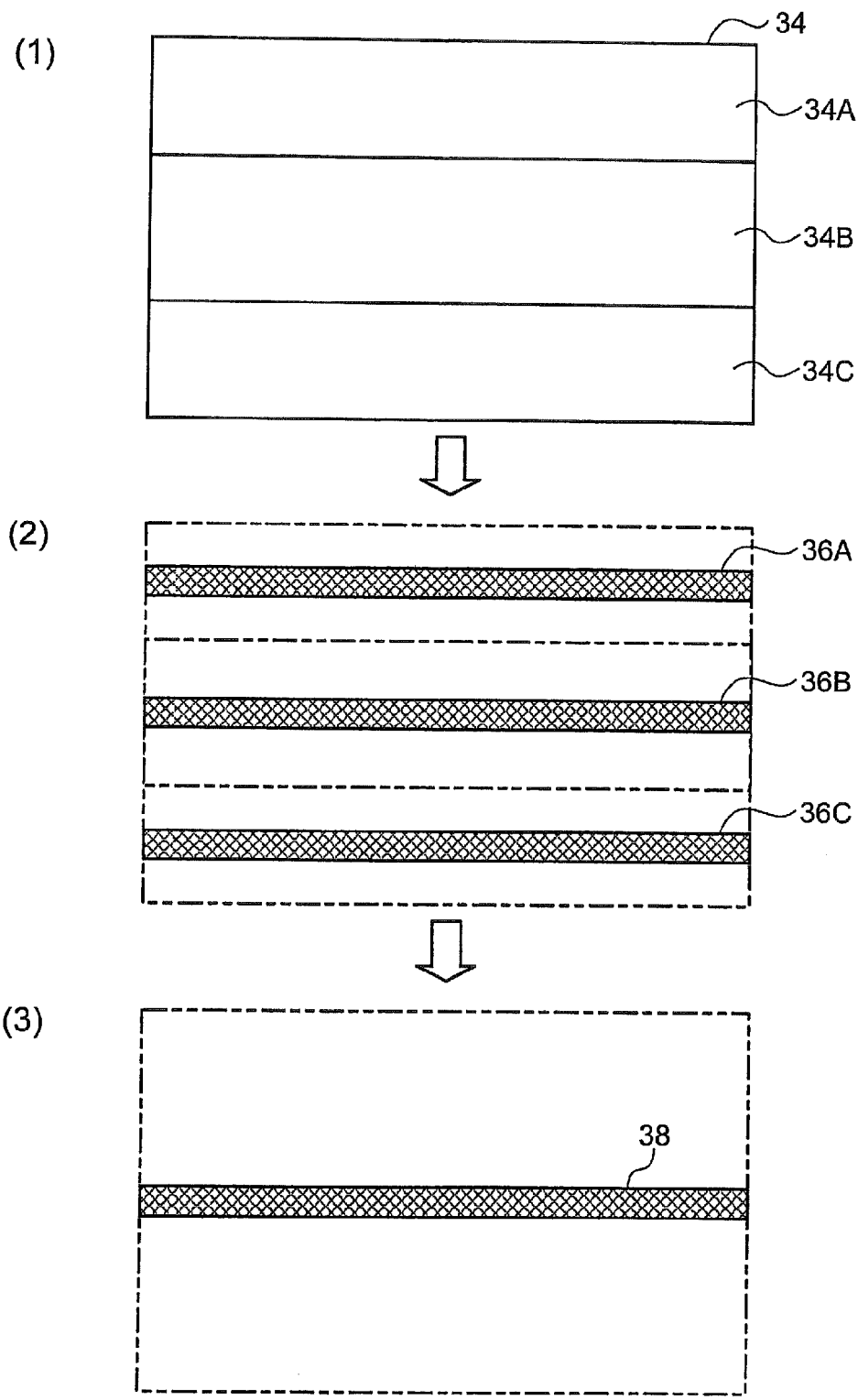
FIG. 4 is explanatory drawing illustrating image processing for abstraction of surrounding conditions of a vehicle.

FIG. 4 illustrate an example of an image obtained by image processing for abstraction of a two dimensional image into a one dimensional image.

As illustrated in (1) of FIG. 4, in the present exemplary embodiment, the captured image 34 is divided into three in the up-down direction, and the surrounding conditions of the vehicle are abstracted by employing upper divided image 34A, middle divided image 34B, and lower divided image 34C. The captured image 34 is divided into the three respective upper, middle, and lower portions in consideration of the fact that an upper portion, middle portion, and lower portion of the captured image 34 may each contain scenery included in mutually independent surrounding conditions of the vehicle. For example, the upper divided image 34A, which is the upper portion of the captured image 34, would be an image that mainly contains the sky that reflects scenery of a sunset or the like. The middle divided image 34B, which is the middle portion of the captured image 34, would be an image that mainly contains trees or the like, reflecting scenery according to the local environment. The lower divided image 34C, which is the lower portion of the captured image 34, would be an image of the surrounding conditions close to the vehicle, reflecting scenery of the road surface, other vehicles, guardrails, and so on.

The surrounding conditions of the vehicle are abstracted using each of the upper divided image 34A, the middle divided image 34B, and the lower divided image 34C. Specifically, as illustrated in (2) of FIG. 4, the upper divided image 34A, the middle divided image 34B, and the lower divided image 34C are respectively converted into widthwise images 36A, 36B, 36C, corresponding to the strip image 38, by executing image combining processing including at least one of averaging processing, addition processing, integration processing, or thinning processing with respect to one image component out of brightness or color included in each lines corresponding to single pixels running in the image up-down direction. The converted widthwise images 36A, 36B, 36C are converted into the strip image 38 illustrated in (3) of FIG. 4 by executing image combining processing including at least one of averaging processing, addition processing, integration processing, or thinning processing, with respect to one image component out of brightness or color for pixels that have matching positions when overlaid. The strip image 38 may accordingly be obtained so as to reflect the scenery of the surrounding conditions of the vehicle in each of the three divided images divided in the up-down direction of the captured image 34, as well as reflecting the brightness and color thereof.

The image processing ECU 12 also operates as the controller to control the projector 28, so as to illuminate the optical fibers with light according to the pixel values of respective pixels, using image signals of the strip image 38. Namely, the image processing ECU 12 outputs image signals of the converted one dimensional image to the projector 28, and the one dimensional image is accordingly projected into the light incident portion 30A by the projector 28. Accordingly, light of the one dimensional image projected by the projector 28 is displayed on the optical fiber fabric 32, thus presenting the surrounding conditions of the vehicle inside the vehicle cabin.

Plural respective strip images 38, corresponding to plural captured images 34 representing the surrounding conditions of the vehicle captured successively accompanying vehicle travel, are presented in time sequence. Accordingly, the local atmosphere may be presented using scenery of a sunset or the like, and the driver may be imparted with a sense of traveling by the movement of, for example, trees, or other vehicles, guardrails, and the like.

In the image processing described above for abstraction of the surrounding conditions of the vehicle, either contrast enhancement processing or color enhancement processing may be performed on at least one of the captured image 34, the upper divided image 34A, the middle divided image 34B, or the lower divided image 34C. Contrast enhancement processing is processing to increase or decrease the contrast, and color enhancement processing is processing to increase or decrease the color number, or to increase or decrease the concentration of a specified color.

Note that the image processing ECU 12 corresponds to an example of a controller and a conversion section of the present disclosure. Further, the image conversion program 20 is an example of a program of a vehicle display device. The projector 28 is an example of plural light sources of the present disclosure. The optical fiber fabric 32 is an example of an optical fiber woven fabric of the present disclosure.

Figure 5:
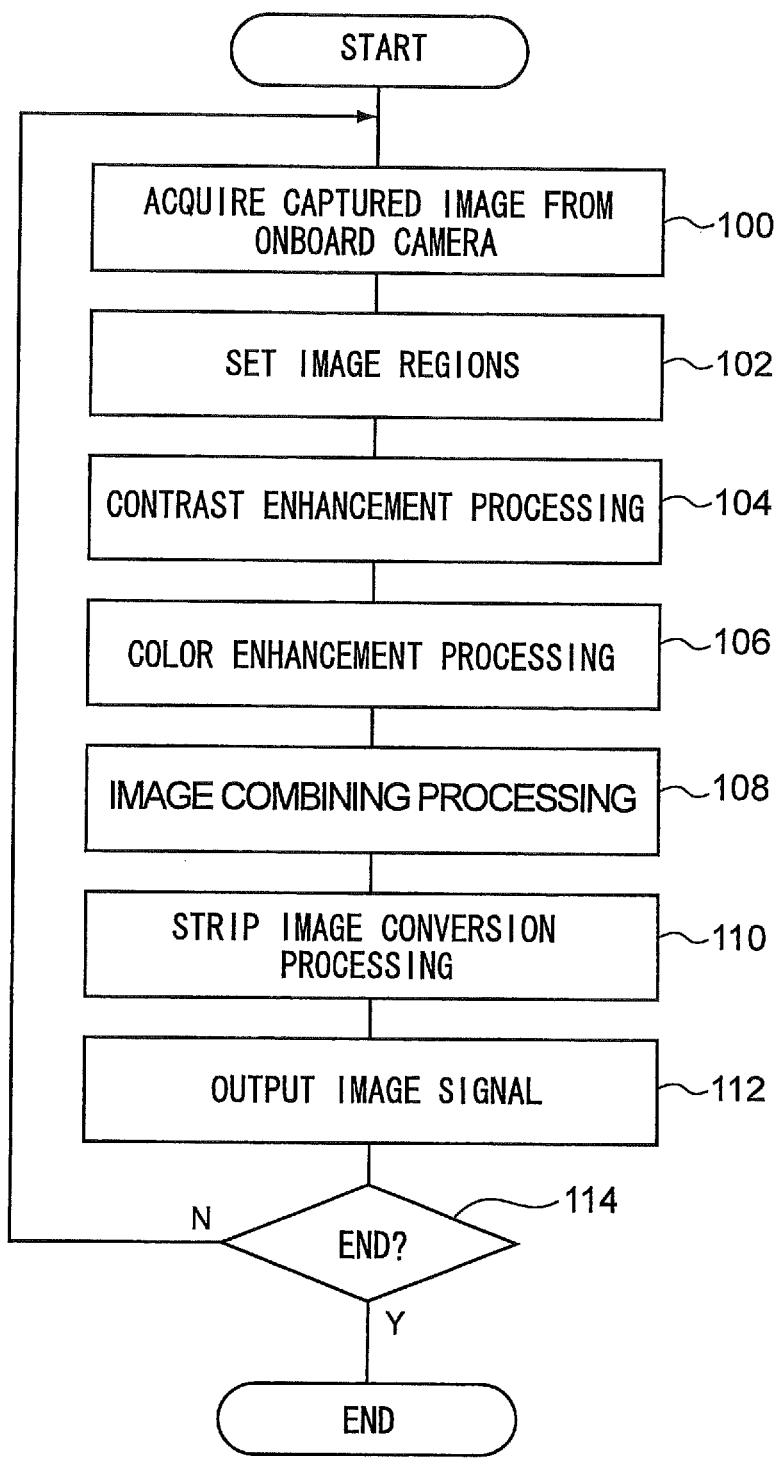
FIG. 5 is a flowchart illustrating a flow of processing executed by an image processing ECU.

As operation of the present exemplary embodiment, explanation follows with reference to the flowchart of FIG. 5 regarding image conversion processing performed by the image processing ECU 12, for example while an ignition switch is switched ON, in a vehicle installed with the vehicle-installed device 10.

For example, in cases in which the driver hands over driving control to the vehicle side using the driving assistance system 33, it is preferable for the driver to be aware of the surrounding conditions of the vehicle that change constantly accompanying travel of the vehicle. For example, when the driver has handed over driving control to the vehicle side, sometimes the driver's level of concentration may be in a reduced state in comparison to a state in which the driver maintains their level of concentration when manually driving the vehicle. When in such a state of reduced concentration, the optical fiber fabric 32 is preferably employed to make the driver aware of the surrounding conditions of the vehicle.

At step 100 of the image conversion processing illustrated in FIG. 5, the image processing ECU 12 acquires an image (captured image 34) of the surrounding conditions on the right side of the vehicle from the onboard camera 26. At the next step 102, image regions are set so as to divide the captured image 34 (dividing the captured image 34 into three respective upper, middle, and lower portions in the present exemplary embodiment). This thereby enables the upper divided image 34A, the middle divided image 34B, and the lower divided image 34C to be obtained from the captured image 34 that has been divided into three respective upper, middle, and lower portions.

Next, the image processing ECU 12 executes predetermined contrast enhancement processing at step 104, and executes predetermined color enhancement processing at step 106, with respect to each of the upper divided image 34A, the middle divided image 34B, and the lower divided image 34C.

Next, the image processing ECU 12 executes image combining processing to convert the upper divided image 34A, the middle divided image 34B, and the lower divided image 34C into the respective widthwise images 36A, 36B, 36C at step 108, and converts the respective widthwise images 36A, 36B, 36C into the strip image 38 at the next step 110.

The image processing ECU 12 outputs an image signal based on the strip image 38 at the next step 112. Then, the image processing ECU 12 proceeds to step 114, and determines whether or not there has been an instruction to end the present processing routine based on, for example, whether or not the vehicle ignition switch has been switched OFF. Processing returns to step 100 and the processing is repeated when a negative determination is made at step 114, and the present processing routine is ended when an affirmative determination is made at step 114.

Figure 6:
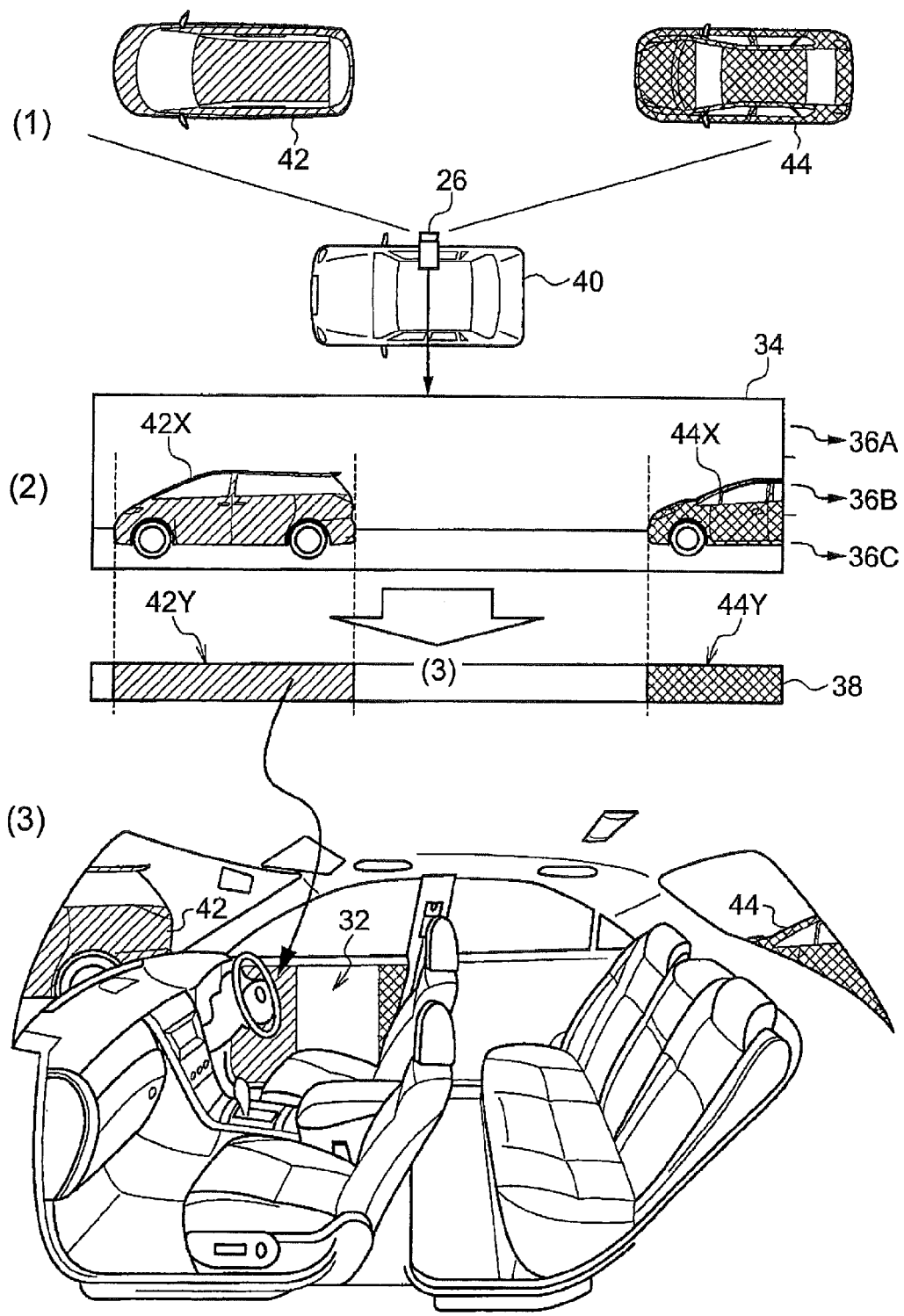
FIG. 6 is drawing illustrating a process for displaying surrounding conditions of a vehicle.
Figure 7:
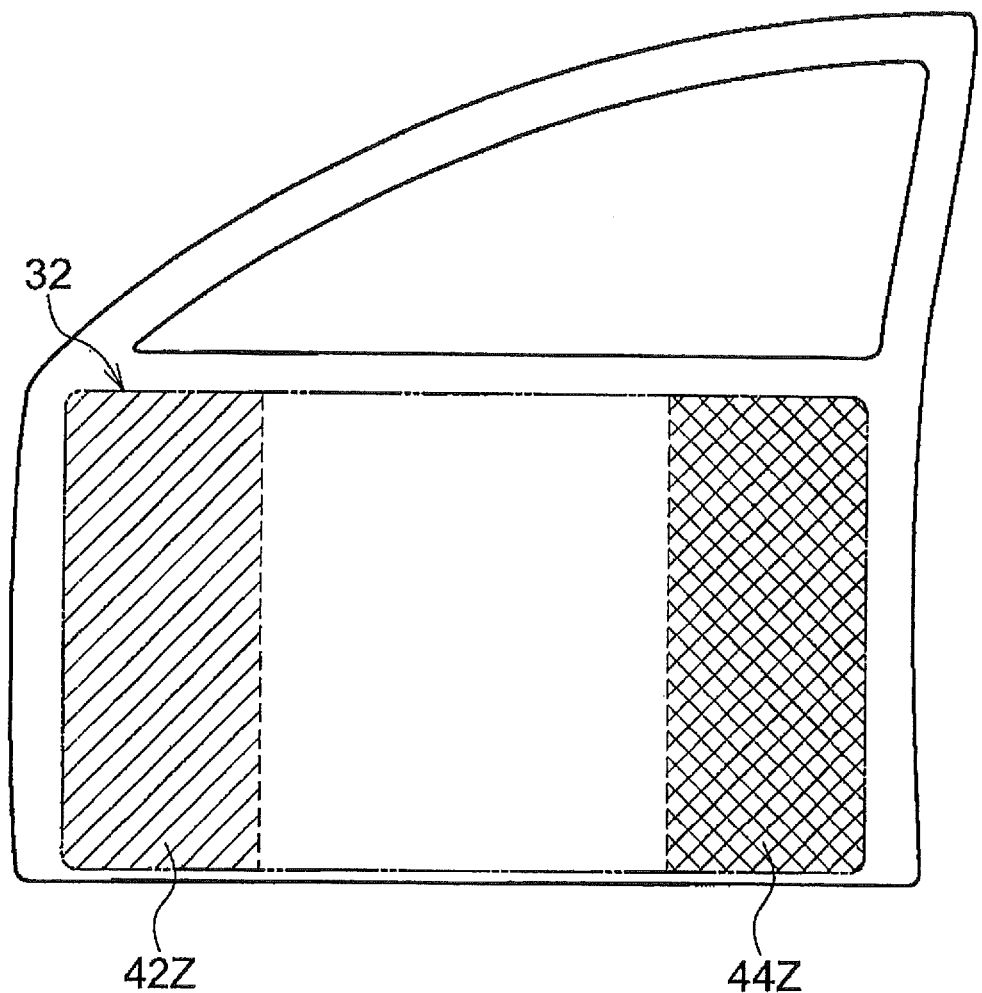
FIG. 7 is a drawing illustrating an optical fiber fabric on which surrounding conditions of a vehicle are displayed.
Figure 8:
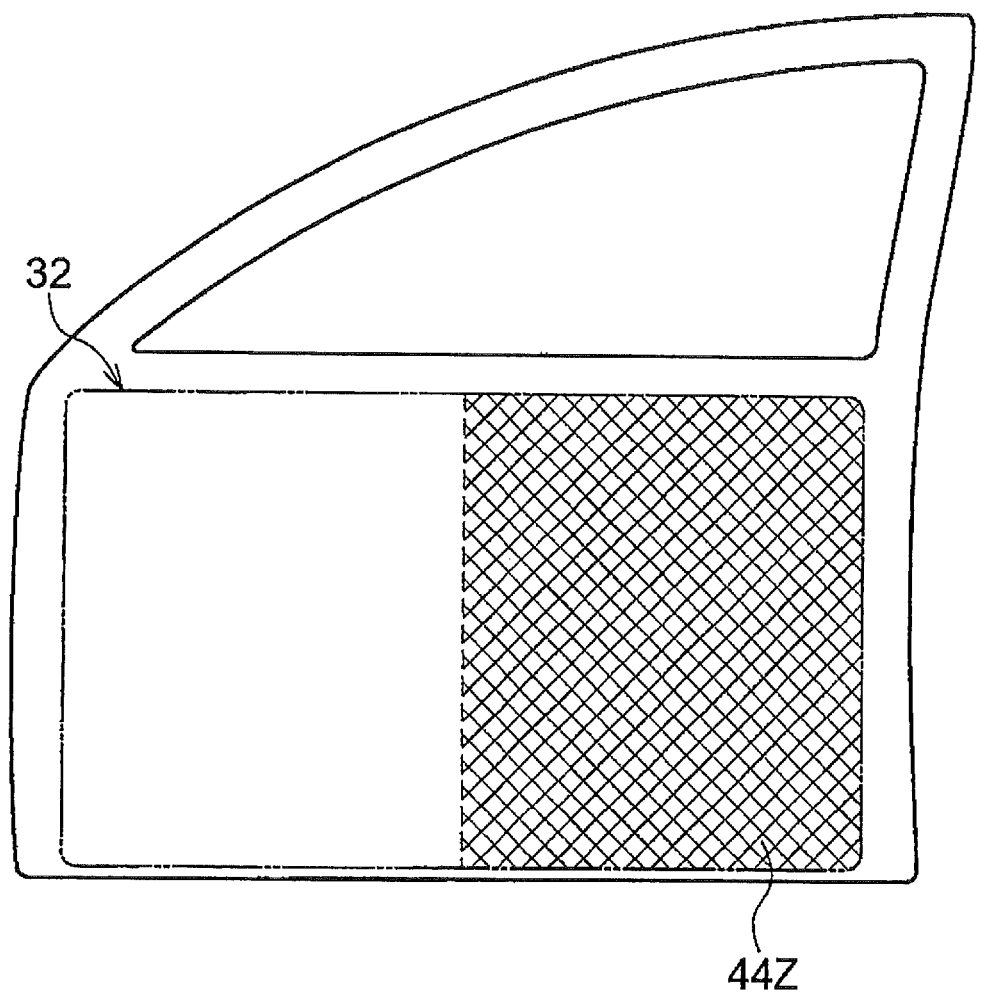
FIG. 8 is a drawing illustrating an optical fiber fabric on which surrounding conditions of a vehicle are displayed.

FIG. 6 illustrate an example of a process in which image conversion processing is executed and the surrounding conditions of the vehicle are displayed on the optical fiber fabric 32. FIG. 7 and FIG. 8 are drawings illustrating the optical fiber fabric 32 that displays the surrounding conditions of the vehicle.

As illustrated in (1) of FIG. 6, as the surrounding conditions of a main vehicle 40, the onboard camera 26 captures images of the surroundings including a first vehicle 42 traveling at the front right side of the main vehicle 40, and a second vehicle 44 traveling at the rear right side of the main vehicle 40. Namely, as illustrated in (2) of FIG. 6, the captured image 34 includes a first vehicle image 42X representing the first vehicle 42, and a second vehicle image 44X representing the second vehicle 44. The captured image 34 is converted into the widthwise images 36A, 36B, 36C, which are converted to the strip image 38. The strip image 38 includes a first image 42Y representing the first vehicle 42, and a second image 44Y representing the second vehicle 44.

An image signal expressing the strip image 38 is output to the projector 28, and the projector 28 illuminates the light incident portion 30A with light of the image, thereby projecting the strip image 38 into the light incident portion 30A of the optical fiber fabric 32. Accordingly, as illustrated in (3) of FIG. 6, the one dimensional image of the strip image 38 is expanded across a two dimensional face by expanding the strip image 38 along the length direction of the optical fibers in the optical fiber fabric 32, so as to be presented as a flat image inside the vehicle cabin. Namely, as illustrated in FIG. 7, the optical fiber fabric 32 presents the driver with a surface configured by side-by-side line images using the optical fibers 32Fb, namely with a first flat image 42Z representing the first vehicle 42, and a second flat image 44Z representing the second vehicle 44.

The surrounding conditions of the main vehicle 40 change constantly accompanying travel of the main vehicle 40. As illustrated in FIG. 8, in the surrounding conditions of the main vehicle 40 in which the first vehicle 42 has moved out of the angle of view of the onboard camera 26, and the second vehicle 44 has drawn closer to the main vehicle 40, the second flat image 44Z is presented to the driver. Here, under the constantly changing surrounding conditions of the main vehicle 40, the changing first flat image 42Z and the second flat image 44Z are presented to the driver gradually, such that the first flat image 42Z illustrated in FIG. 7 moves toward the vehicle front and becomes gradually smaller, and the second flat image 44Z moves toward the vehicle front and becomes gradually larger, until reaching the image presented on the optical fiber fabric 32 illustrated FIG. 8.

The flat image is thus implemented by increasing and decreasing the line images representing the first vehicle 42 and the second vehicle 44 in the surrounding conditions. Accordingly, the present exemplary embodiment may enable the driver to be intuitively aware of the conditions of the first vehicle 42 driving away from the main vehicle 40, and the conditions of the second vehicle 44 coming closer to the main vehicle 40.

The image presented by the optical fiber fabric 32 using the projector 28 may be an image in which only the brightness of light of the strip image 38, which is illuminated into the light incident portion 30A, has been adjusted. Namely, the optical fiber fabric 32 may present the surrounding conditions of the main vehicle 40 using high and low brightness, and the surrounding conditions of the main vehicle 40 may be presented by movement of the high and low brightness portions according to the successively acquired captured images 34.

The surrounding conditions of the main vehicle 40 may also be presented as colored information by using the projector 28 to illuminate the light incident portion 30A with a strip image 38 including color. Namely, the optical fiber fabric 32 may present the surrounding conditions of the main vehicle 40 in color, and may, for example, present the surrounding conditions of the main vehicle 40 in colors relevant to the color of a sunset, or the colors of vehicles.

As described above, in the present exemplary embodiment, the captured image 34, which is a two dimensional image of the surrounding conditions of the vehicle captured by the onboard camera 26, undergoes image conversion to the strip image 38, which is a one dimensional image, and the strip image 38 is projected into the light incident portion 30A of the optical fiber fabric 32 by the projector 28. The optical fiber fabric 32 presents the one dimensional image of the strip image 38 inside the vehicle cabin as a flat image expanded along the length direction of the optical fibers.

Accordingly, by using the projector 28 to provide strip images 38 using brightness of light input to the optical fiber fabric 32, the surrounding conditions of the main vehicle 40 are presented using high and low brightness. Thus, the moving high and low brightness portions according to successively captured images 34 may present the surrounding conditions of the main vehicle 40. For example, moving the brightness of light representing trees, or other vehicles, guardrails or the like included in plural captured images 34 successively captured accompanying vehicle travel enables the driver to be imparted with a sense of traveling.

Further, by providing strip images 38 that include color contained in the captured images 34 to the optical fiber fabric 32, the present exemplary embodiment may present the local atmosphere using scenery such as a sunset, and trees or other vehicles, and may abstract and present the local atmosphere to the driver as flat images by the optical fiber fabric 32.

In the present exemplary embodiment, in order to suppress brightness and color representing the surrounding conditions of the vehicle from being poorly reflected due to a bias toward the white side in the converted image when converting from a two dimensional image to a one dimensional image, image processing is performed to divide the captured image and abstract the surrounding conditions of the vehicle. In this image processing, the respective divided images are converted into the widthwise images, and the strip image is obtained from the converted widthwise images. Using a composite image employing the respective divided images in this manner enables the optical fiber fabric 32 to present a flat image of the surrounding conditions of the vehicle using light that reflects at least one out of brightness or color.

Moreover, in the present exemplary embodiment, in cases in which the driver hands over driving control to the vehicle side using the driving assistance system 33, by using the optical fiber fabric 32 to present the surrounding conditions of the vehicle that change constantly accompanying vehicle travel, the driver may be easily be made aware of the surrounding conditions of the vehicle even in a state in which the driver's level of concentration has dropped in comparison to a state in which the driver maintains their level of concentration when manually driving the vehicle.

In the present exemplary embodiment, explanation has been given regarding a case in which the onboard camera 26 captures the surrounding conditions on the right side of the vehicle. However, the surrounding conditions of the vehicle are not limited to the right side of the vehicle. For example, the surrounding conditions of the vehicle may be on the left side of the vehicle, may be to the rear of the vehicle, or may be a combination thereof.

In the present exemplary embodiment, explanation has been given regarding a case in which the captured image 34 is divided into three. However, the captured image 34 is not limited to being divided into three, and may be divided into two, or divided into four or more. Moreover, in the present exemplary embodiment, explanation has been given regarding a case employing divided images from the captured image 34. However, a portion of the image may be extracted from the captured image 34 and may be employed as divided images. Moreover, in the present exemplary embodiment, explanation has been given regarding a case in which the captured image 34 is divided cleanly. However, the divided images may be defined such that portions of the respective divided images overlap with portions of the other divided images.

In the present exemplary embodiment, the three respective upper, middle, and lower divided images from the captured image 34 are subject to execution of contrast enhancement processing and color enhancement processing. However, at least one of the upper divided image 34A, the middle divided image 34B, or the lower divided image 34C may be the subject of contrast enhancement processing and color enhancement processing. In the above explanation, the contrast enhancement processing and color enhancement processing are executed after dividing the captured image 34. However, execution may be made to the captured image 34 itself. Moreover, a composite image may be the subject to contrast enhancement processing and color enhancement processing after image combining processing has been executed.

Figure 9:
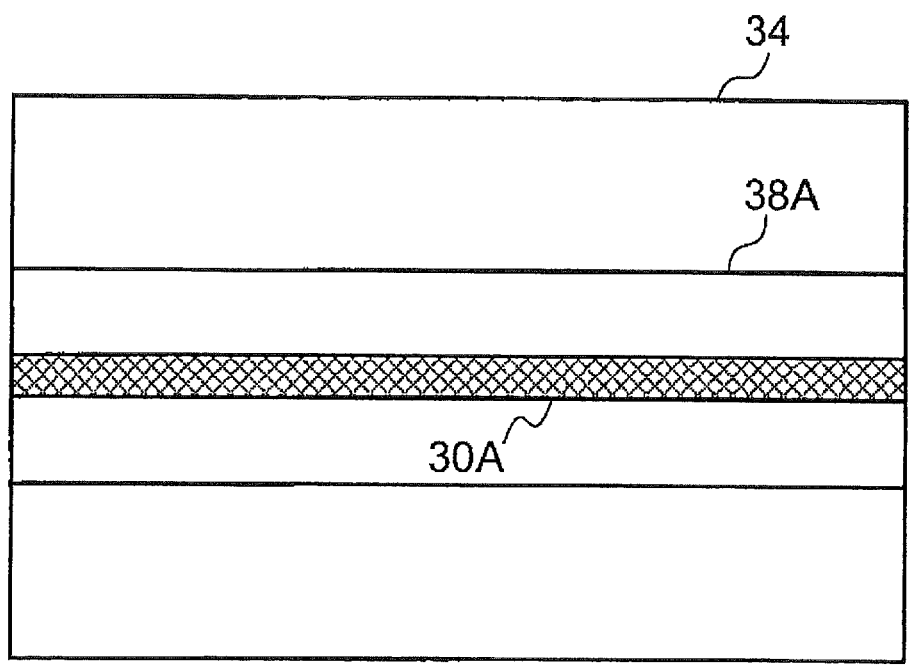
FIG. 9 is an explanatory drawing illustrating a modified example in which light is projected onto an optical fiber fabric based on a captured image.

In the present exemplary embodiment, explanation has been given regarding a case in which the strip image 38 is obtained by dividing the captured image 34 into plural portions, and executing image processing on each of the divided images during image processing to abstract the surrounding conditions of the vehicle. However, there is no limitation to converting the captured image 34 to the strip image 38 to be projected. For example, as illustrated in FIG. 9, the captured image 34 may be converted into a strip image 38A that is longer than the length of the light incident portion 30A in the width direction, and a portion of the strip image 38A may be projected into the light incident portion 30A, this being configured by the one ends of the optical fibers 32Fb. In such cases, the positions of the strip image 38A and the light incident portion 30A are capable of moving relative to each other, thereby enabling the surrounding conditions of the vehicle to be adjusted so as to represent up-down direction-dependent scenery respectively included in an upper portion, middle portion, and lower portion of the captured image 34.

Second Exemplary Embodiment

Next, explanation follows regarding a second exemplary embodiment. In the second exemplary embodiment, configurations similar to those of the first exemplary embodiment are allocated the same reference numerals, and explanation thereof is omitted. In the second exemplary embodiment, the present disclosure is applied so as to impart a driver with a sense of speed of the vehicle during vehicle travel.

Figure 10:
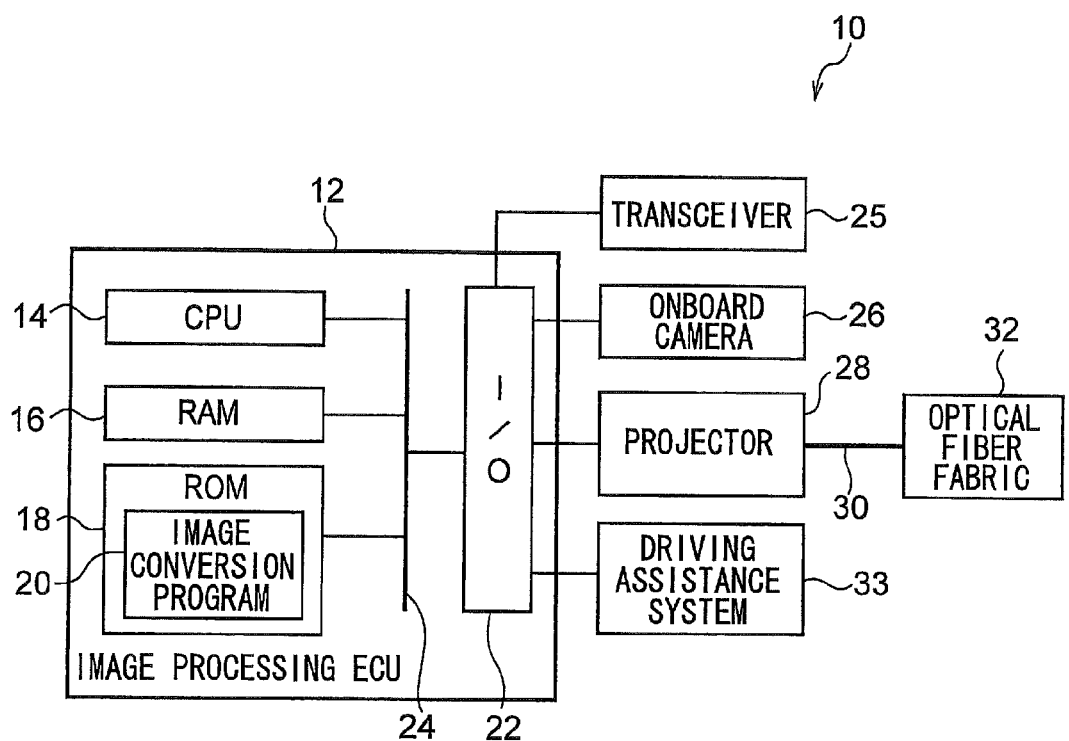
FIG. 10 is a block diagram illustrating configuration of a vehicle-installed device according to a second exemplary embodiment.

FIG. 10 illustrates a configuration of a vehicle-installed device 10 according to the present exemplary embodiment. The vehicle-installed device 10 includes the image processing ECU 12, a transceiver 25, the onboard camera 26, the projector 28, the fastening strip 30, and the optical fiber fabric 32.

The transceiver 25 is a communication device for exchanging information between the main vehicle 40 and an external device. An example of the transceiver 25 is a device that receives road conditions by, for example, communicating between the road and the vehicle with a wireless transceiver that performs narrowband communication using Dedicated Short Range Communications (DSRC).

In the present exemplary embodiment, the transceiver 25 receives information indicating the surrounding conditions of the vehicle, and the image processing ECU 12 acquires the received information indicating the surrounding conditions of the vehicle. The information indicating the surrounding conditions of the vehicle may include information for imparting the driver with a sense of speed of the vehicle. Examples of information for imparting the driver with a sense of speed include speed restriction information to limit the speed of travel, and information for imparting awareness of increases or decreases in the speed of travel according to inclines of the road.

The driver is aware of the speed of travel while driving the main vehicle 40. However, sometimes on inclines, for example, the main vehicle 40 may increase or decrease in speed without this being the driver's intention. The driver could be imparted with a sense of speed by performing a display on the road surface to alert the driver with a sense of speed during an unintended increase or decrease in the speed of the main vehicle 40, as illustrated in FIG. 11.

Figure 11:
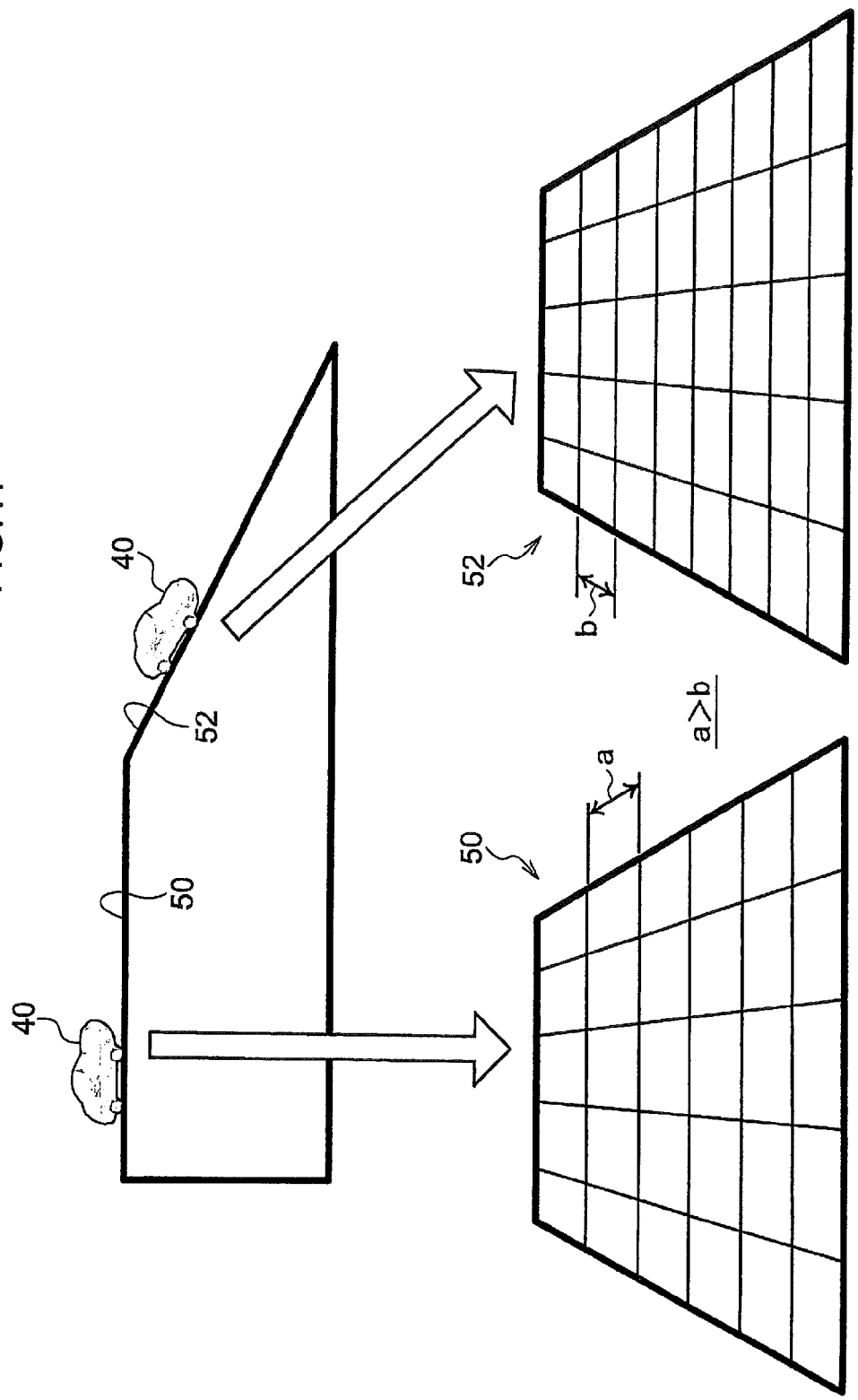
FIG. 11 is an explanatory drawing to illustrate imparting a sense of speed to a driver.

As illustrated in FIG. 11, when the main vehicle 40 travels from a flat road 50 to a downward incline road 52, a display could be performed on the road surface at a specific spacing a on the flat road 50, and a display performed on the road surface at a specific spacing b that is shorter than the specific spacing a (a>b) on the downward incline 52. This thereby enables a sense of speed to be imparted to the driver, suppressing an unintended increase in speed of the main vehicle 40 when the main vehicle 40 is traveling on the downward incline 52.

In the present exemplary embodiment, the optical fiber fabric 32 is used for imparting the driver with a sense of speed, without performing a display on the road surface, in order to easily impart the driver with a sense of speed.

Figure 12:
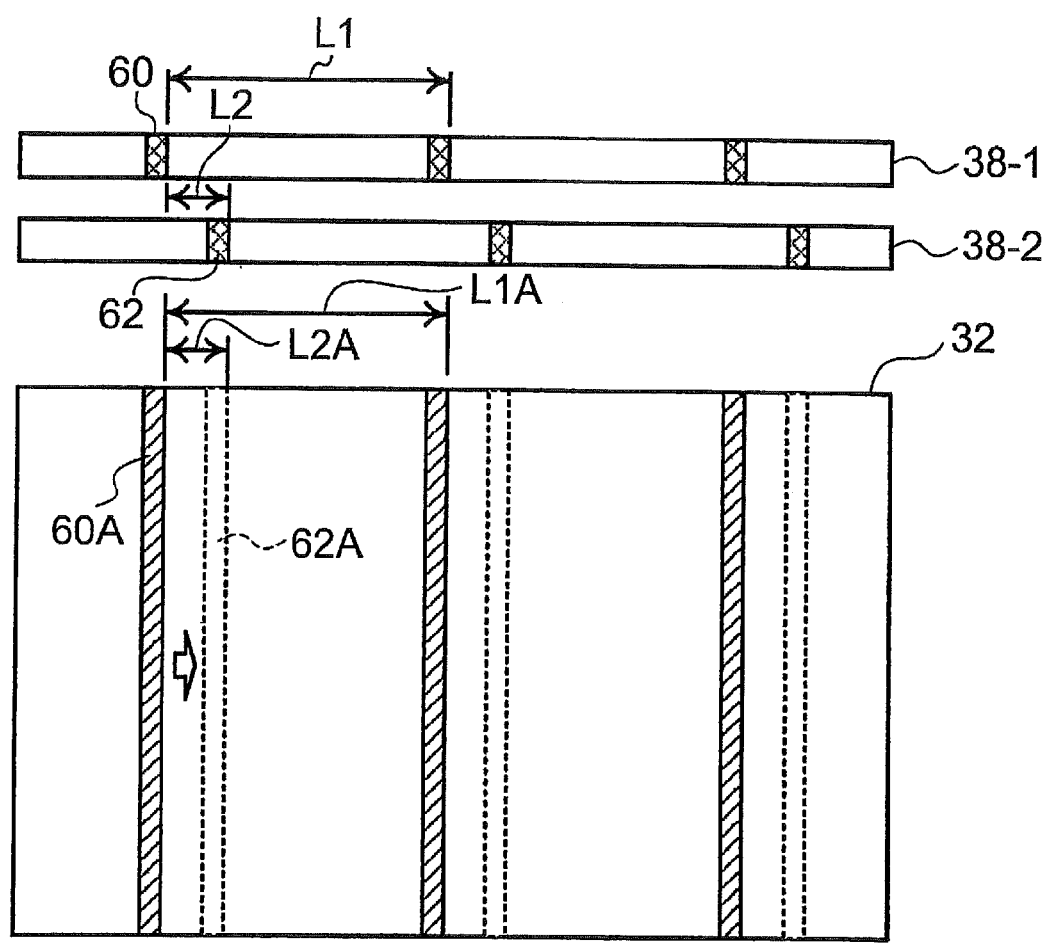
FIG. 12 is a drawing illustrating an optical fiber fabric for imparting a sense of speed to a driver.
Figure 13:
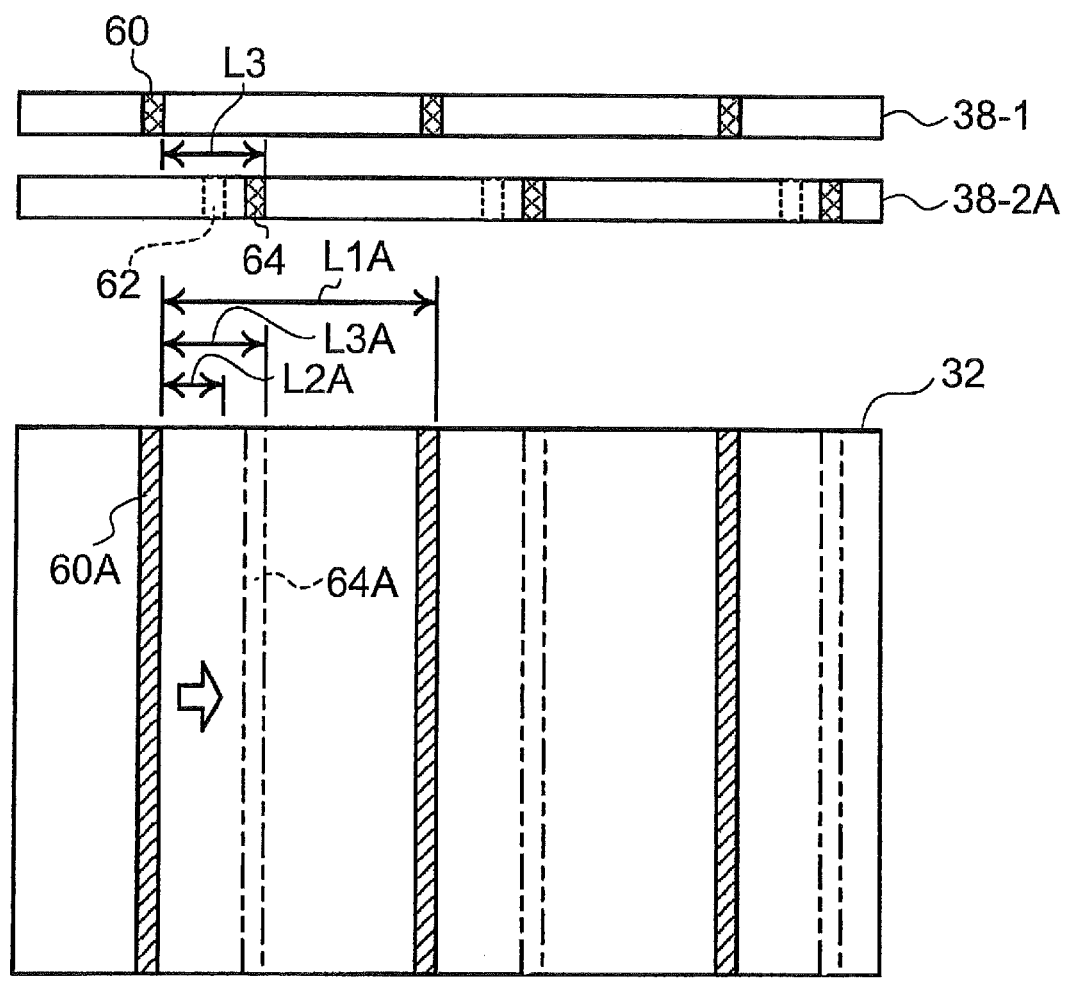
FIG. 13 is a drawing illustrating an optical fiber fabric for imparting a sense of speed to a driver.

FIG. 12 and FIG. 13 are drawings illustrating the optical fiber fabric 32 for imparting the driver with a sense of speed. FIG. 12 illustrates the optical fiber fabric 32 imparting the driver with a sense of speed by displaying lights at a specific spacing. FIG. 13 illustrates the optical fiber fabric 32 imparting the driver with a greater sense of speed than in FIG. 12.

As illustrated in FIG. 12, for example, white light points 60 with a specific spacing L1 are combined into a strip image acquired from the captured image 34 captured by the onboard camera 26, at a specific timing. A combined strip image 38-1 is emitted as line images 60A with a specific spacing L1A, by lighting up the optical fibers 32Fb of the optical fiber fabric 32. After a specific time duration, light points 62 are combined into the strip image at positions at a specific distance L2 from the light points 60, according to the current vehicle speed, or a predetermined vehicle speed. A combined strip image 38-2 is emitted as line images 62A with the specific spacing L1A and at positions separated from the line images 60A by a specific distance L2A, by lighting up the optical fibers 32Fb of the optical fiber fabric 32. The line images thus move across the optical fiber fabric 32, enabling the driver to be imparted with a sense of speed.

Note that the sense of speed with which the driver is imparted may include an alert. The present exemplary embodiment may impart the driver with an emphasized sense of speed.

As illustrated in FIG. 13, in the present exemplary embodiment, the length of the specific distance L2A of the line images 62A with the light points 62, that are presented after the specific time duration has elapsed, can be increased or decreased according to the sense of speed to be imparted. Namely, for example in a case in which the driver is to be imparted with a sense of increasing speed, light points 64 are combined into the strip image 38-2A at a distance L3 from the light points 60 further away than the specific distance L2 after the specific time duration has elapsed. A thus combined strip image 38-2A is emitted as line images 64A at the specific spacing L1A and at positions separated from the line images 60A by a specific distance L3A. The line images thus move across the optical fiber fabric 32 more quickly, enabling the driver to be imparted with a sense of increasing speed. Note that the light points 64 may be combined into the strip image 38-2A at a distance from the light points 60 closer than the specific distance L2 in order to impart the driver with a sense of decreasing speed.

Next, explanation follows regarding operation of the present exemplary embodiment. In the present exemplary embodiment, as processing executed by the image processing ECU 12, the image conversion processing illustrated by the flowchart in FIG. 14 is executed in place of the image conversion processing illustrated by the flowchart in FIG. 5.

Figure 14:
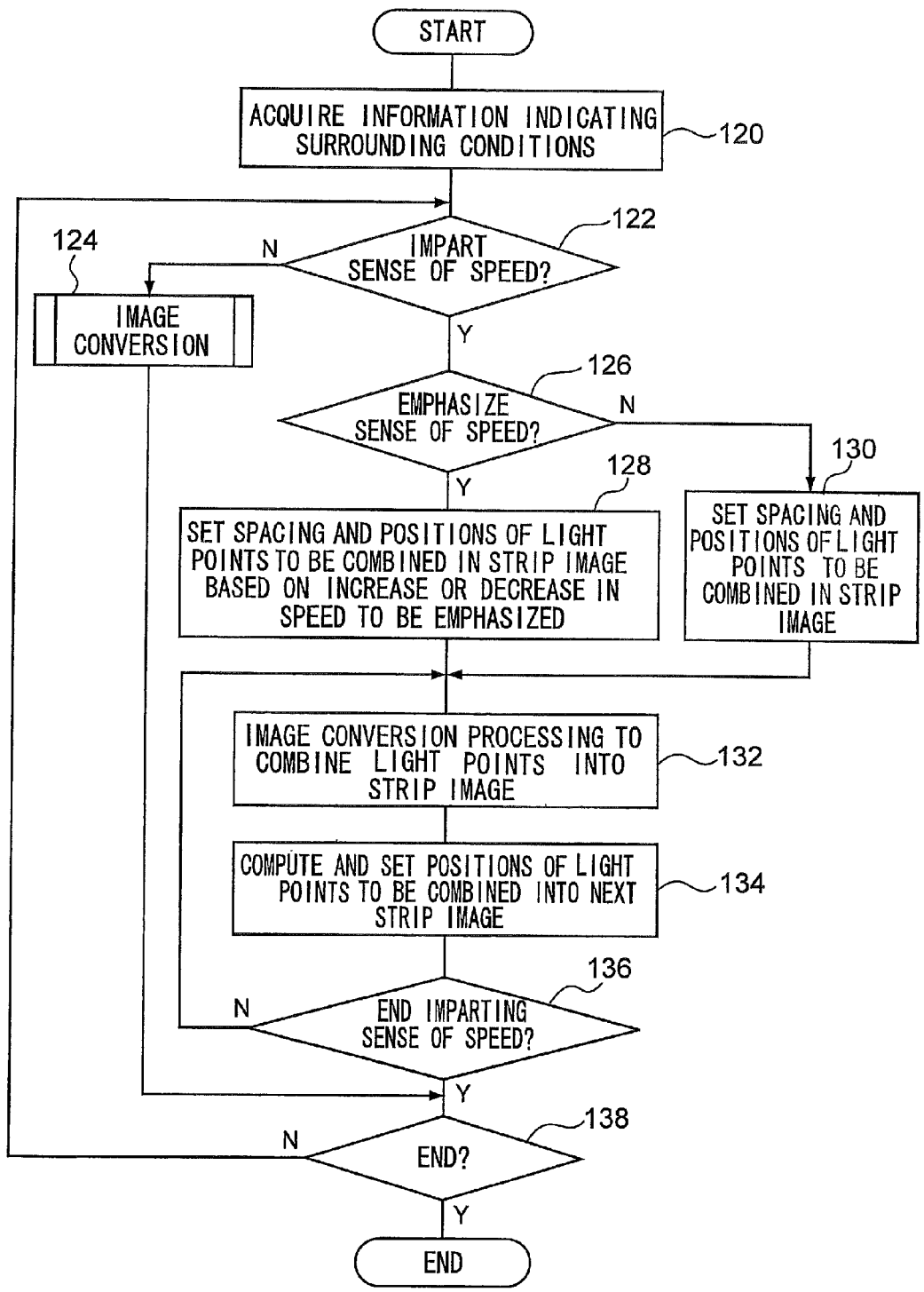
FIG. 14 is a flowchart illustrating a flow of processing executed by an image processing ECU according to the second exemplary embodiment.

At step 120 of the image conversion processing illustrated in FIG. 14, the image processing ECU 12 acquires information indicating the surrounding conditions of the vehicle from the transceiver 25. At the next step 122, determination is made as to whether or not the acquired information indicating the surrounding conditions includes information for imparting the driver with a sense of speed. Processing proceeds to step 124 when a negative determination is made.

At step 124, image conversion processing similar to the processing at step 100 to step 112 illustrated in FIG. 5 is executed, then the processing proceeds to step 138. Since the processing at step 124 is similar to the processing at step 100 to step 112 illustrated in FIG. 5, explanation thereof is omitted. At step 138, similarly to in the processing at step 114 illustrated in FIG. 5, determination is made as to whether or not there has been an instruction to end the present processing routine, based on, for example, whether or not the vehicle ignition switch has been switched OFF. Processing returns to step 122 when a negative determination is made at step 138, and the present processing routine is ended when an affirmative determination is made.

Processing proceeds to step 126 when an affirmative determination is made at step 122. At step 126, determination is made as to whether or not to emphasize the sense of speed with which the driver is to be imparted, based on the information for imparting the driver with a sense of speed. For example, a sense of increasing speed may be emphasized in cases in which the vehicle speed is in excess of the speed limit when speed restriction information to limit the speed of travel is acquired from the transceiver 25.

When the determination is negative at step 126, at step 130, the specific spacing L1, the specific distance L2 corresponding to the current vehicle speed or a predetermined vehicle speed, and the positions are set for the light points 60 to be combined into the strip image (see FIG. 12). When an affirmative determination is made at step 126, however, at step 128 the specific spacing L1, a specific distance L3 corresponding to the increase or decrease in speed to be emphasized, and the positions are set for the light points 60 to be combined into the strip image in order to emphasize the sense of speed (see FIG. 13).

Next, at step 132, image conversion processing is executed to combine the light points 60 set at step 128 or at step 130 into the strip image 38-1. At step 132, the processing of step 100 to step 112 illustrated in FIG. 5 is executed. When this is performed, the processing to combine the light points 60 into the strip image 38-1 is executed after the processing of step 110 in FIG. 5. At the next step 134, the positions of the light points 62 to be combined into the next strip image 38-2 or 38-2A are computed and set. At step 134, the positions of the next light points to be combined are computed and set using the specific distance L2 or L3 according to the current vehicle speed or predetermined vehicle speed set at step 128 or step 130.

At the next step 136, determination is made as to whether or not to end imparting a sense of speed. Processing proceeds to step 138 when an affirmative determination is made, and processing returns to step 132 when a negative determination is made. The determination at step 136 may be made based on the information for imparting a sense of speed to the driver acquired at step 120. For example, if information specifying a specific duration for imparting a sense of speed to the driver was acquired, then determination may be made at step 136 as to whether or not the specific duration has elapsed. Moreover in cases in which information indicating that imparting a sense of speed is to be ended is acquired, at step 136 information may be acquired from the transceiver 25, and determination may be made as to whether or not the information indicating that imparting a sense of speed is to be ended is included in the acquired information.

As described above, in the present exemplary embodiment, lights at a specific spacing (line images) that move in time sequence are presented using the optical fiber fabric 32, thereby enabling the driver to be imparted with a sense of speed. The sense of speed can be emphasized by increasing or decreasing the movement amount of the lights moving at the specific spacing.

In the present exemplary embodiment, explanation has been given regarding a case in which information indicating surrounding conditions of the vehicle is acquired using the transceiver 25. However, acquiring the information indicating the surrounding conditions of the vehicle is not limited to using the transceiver 25, and there is no limitation to providing the transceiver 25. For example, information indicating the surrounding conditions of the vehicle may be acquired using a navigation system, which also functions as a transceiver. Moreover, configuration may be made so as to extract information indicating the surrounding conditions of the vehicle from the captured images 34 from the onboard camera, to identify whether or not extracted images thus extracted match predetermined scenes in which a sense of speed is to be imparted to the driver, and to make determination as to whether or not to impart a sense of speed.

Third Exemplary Embodiment

Next, explanation follows regarding a third exemplary embodiment. In the third exemplary embodiment, configurations similar to those of the first exemplary embodiment and the second exemplary embodiment are allocated the same reference numerals, and explanation thereof is omitted.

Figure 15:
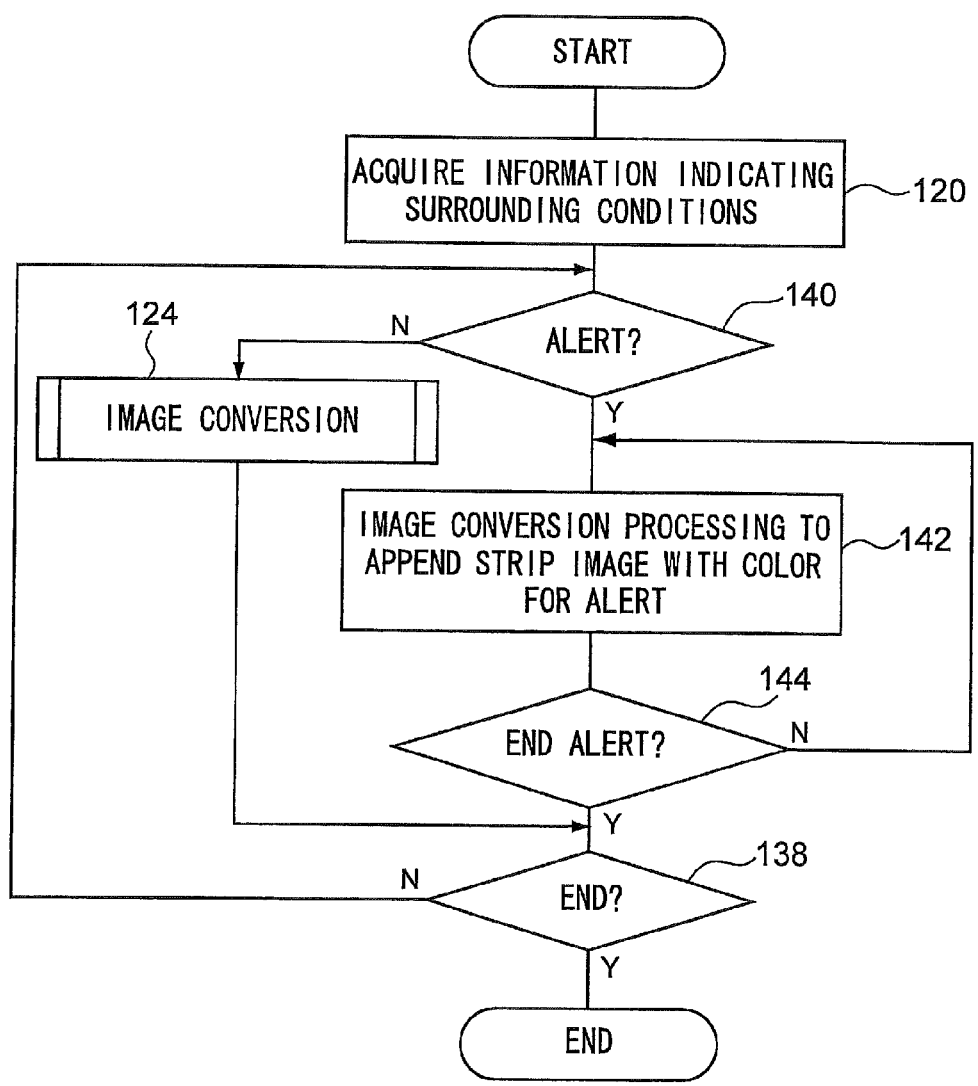
FIG. 15 is a flowchart illustrating a flow of processing executed by an image processing ECU according to a third exemplary embodiment.

Next, explanation follows regarding operation of the present exemplary embodiment. In the present exemplary embodiment, as processing executed by the image processing ECU 12, the image conversion processing illustrated by the flowchart in FIG. 15 is executed in place of the image conversion processing illustrated by the flowchart in FIG. 14.

The image processing ECU 12 acquires information indicating the surrounding conditions of the vehicle from the transceiver 25, similarly to at step 120 of the image conversion processing illustrated in FIG. 14. At the next step 140, a determination is made as to whether or not to execute an alert, by determining whether or not the acquired information indicating the surrounding conditions includes information indicating an alert. Processing proceeds to step 124 when a negative determination is made. An example of information indicating an alert is information from outside the vehicle that is relayed to the driver. At step 124, processing proceeds to step 138 after executing image conversion processing similar to the processing illustrated in FIG. 14.

Processing proceeds to step 142 when an affirmative determination is made at step 140. At step 142, image conversion processing is executed to append the strip image 38 with a predetermined color (for example, red or yellow) according to the information indicating an alert. The processing of step 100 to step 112 illustrated in FIG. 5 is executed at step 142. When this is performed, processing is executed to combine the predetermined color according to the information indicating an alert into the strip image 38 after the processing at step 110 illustrated in FIG. 5.

At the next step 144, determination is made as to whether or not to end the alert. Processing proceeds to step 138 when an affirmative determination is made, and processing returns to step 142 when a negative determination is made. The determination at step 144 may be made based on the information indicating an alert, similarly to at step 136 illustrated in FIG. 14. For example, if information specifying a specific duration for imparting an alert is acquired, then a determination may be made at step 144 as to whether or not the specific duration has elapsed. Moreover, in cases in which information indicating that presenting an alert is to be ended is acquired, at step 144, information may be acquired from the transceiver 25, and a determination may be made as to whether or not the information indicating that presenting an alert is to be ended is included in the acquired information.

As described above, in the present exemplary embodiment, information indicating an alert is presented using the optical fiber fabric 32. Accordingly, the present exemplary embodiment may enable the driver to be prompted with an alert.

In the above exemplary embodiments, explanation has been given regarding cases in which the strip image 38 is projected by the projector 28. However, the present disclosure is not limited to projecting the strip image 38 with the projector 28. For example, an LED array in which LED light sources are arrayed in one dimension may be provided, and at least one out of the brightness or color of the LED array arrayed in one dimension may be controlled according to image signals.

Note that the disclosed embodiments may also be applied to manual driving. In the above exemplary embodiments, explanation has been given regarding cases in which the present disclosure is applied in cases in which the driver is assisted by the driving assistance system 33 when driving the vehicle. However, the present disclosure is not limited thereto. For example, the present disclosure may be applied in cases in which the driver manually drives the vehicle.

In the above exemplary embodiments, explanation has been given in a case in which the driver is an example of an occupant; however, the present disclosure may be applied to any occupant aboard the vehicle.

In the above exemplary embodiments, explanation has been given regarding cases in which the optical fiber fabric 32 is provided at a single location; however, the optical fiber fabric 32 for display may be provided at plural locations.

In the present exemplary embodiment, explanation has been given in a case in which processing is performed by executing a program indicating a processing flow by the image processing ECU 12; however, the processing of the program may be implemented by hardware.

The processing performed by the image processing ECU 12 in the above exemplary embodiments may be stored and distributed as a program on a storage medium or the like.

What is claimed is:

1. A vehicle display device comprising:
an image processing electronic control unit that converts at least a portion of each image of a plurality of images into respective strip images, each of the strip images having a plurality of pixels arrayed along a direction of vehicle travel, the plurality of images being obtained by successively capturing the images of the surroundings of a vehicle;
an optical fiber woven fabric having a plurality of optical fibers woven as warp or weft together with threads, end portions of the plurality of optical fibers arrayed along a specified direction, the plurality of optical fibers extending in a vehicle up-down direction that crosses the direction of vehicle travel and being disposed adjacent to each other in the direction of vehicle travel and covering a two-dimensional area of an interior surface of the vehicle that is viewable by an occupant of the vehicle; and
a plurality of light sources arrayed such that light emitted from each of the plurality of light sources is incident at the end portion of at least one of the optical fibers, wherein
the image processing electronic control unit controls the plurality of light sources so as to emit light according to a pixel value of each pixel in the strip images.

2. The vehicle display device of claim 1, wherein each of the strip images is expressed by pixel values representing at least one of a brightness or a color of each pixel.

3. The vehicle display device of claim 1, wherein the image processing electronic control unit converts a composite image, which is obtained by combining images included in respective divided regions obtained by dividing each image of the plurality of images into a plurality of regions, into each of the strip images.

4. The vehicle display device of claim 1, further comprising a transceiver that acquires sense of speed information,
wherein the image processing electronic control unit combines light points having a specific spacing into the strip images such that the light points having the specific spacing move in each strip image when the sense of speed information has been acquired by the image processing electronic control unit.

5. The vehicle display device of claim 1, further comprising a transceiver that acquires information indicating surrounding conditions of the vehicle,
wherein the image processing electronic control unit appends a predetermined color to the strip images when it is determined that there is a need to alert an occupant based on the information indicating surrounding conditions of the vehicle acquired by the transceiver.

6. A vehicle display method comprising:
converting, with an image processing electronic control unit, at least a portion of each image of a plurality of images into respective strip images, each of the strip images having a plurality of pixels arrayed along a direction of vehicle travel, the plurality of images being obtained by successively capturing the images of the surroundings of a vehicle; and
effecting control, with the image processing electronic control unit, for each of the strip images, such that light according to a pixel value of each pixel in the strip images is emitted from a plurality of light sources, which are arrayed such that the light emitted from each of the plurality of light sources is incident at an end portion of at least one optical fiber in an optical fiber woven fabric having a plurality of optical fibers woven as warp or weft together with threads, with end portions of the plurality of optical fibers being arrayed along a specified direction, the plurality of optical fibers extending in a vehicle up-down direction that crosses the direction of vehicle travel and being disposed adjacent to each other in the direction of vehicle travel and covering a two-dimensional area of an interior surface of the vehicle that is viewable by an occupant of the vehicle.

7. A vehicle display device comprising:

an image processing electronic control unit that converts a sequence of captured images of surroundings of a vehicle into a sequence of strip images, each of the strip images having a plurality of pixels arrayed along a direction of vehicle travel of the vehicle;

an optical fiber woven fabric having a plurality of optical fibers woven together with threads, first end portions of the plurality of optical fibers arrayed along a specified direction, the plurality of optical fibers extending in a vehicle up-down direction that crosses the direction of vehicle travel and being disposed adjacent to each other in the direction of vehicle travel and covering a two-dimensional area of an interior surface of the vehicle that is viewable by an occupant of the vehicle; and a plurality of light sources that emit light to the first ends of the plurality of optical fibers, wherein the image processing electronic control unit controls the plurality of light sources so as to emit light according to pixel values of each pixel in the sequence of strip images.

8. The vehicle display device of claim 7, wherein the pixel values of the strip images represent at least one of a brightness or a color of each pixel.

9. The vehicle display device of claim 7, wherein the image processing electronic control unit converts each of the captured images into each of the strip images by (i) dividing the captured image into a plurality of regions, (ii) obtaining a strip image for each of the regions, and (iii) combining the strip images of the plurality of regions into a composite strip image for the captured image.

10. The vehicle display device of claim 7, further comprising a transceiver that acquires sense of speed information, wherein the image processing electronic control unit combines light points having a specific spacing into the sequence of strip images such that the light points having the specific spacing move as the sequence of strip images are displayed via the projector and the optical fiber woven fabric.

11. The vehicle display device of claim 7, further comprising a transceiver that acquires information indicating surrounding conditions of the vehicle, wherein the image processing electronic control unit appends a predetermined color to the sequence of strip images when it is determined that there is a need to alert an occupant based on the information indicating surrounding conditions of the vehicle acquired by the transceiver.

12. The vehicle display device of claim 1, wherein the interior surface of the vehicle covered by the optical fiber woven fabric is located on a door of the vehicle.

13. The vehicle display method of claim 6, wherein the interior surface of the vehicle covered by the optical fiber woven fabric is located on a door of the vehicle.

14. The vehicle display device of claim 7, wherein the interior surface of the vehicle covered by the optical fiber woven fabric is located on a door of the vehicle.

* * * * *